United States Patent [19]
De Vries

[11] 3,752,364
[45] Aug. 14, 1973

[54] CONTAINER FOR ICE CREAM

[76] Inventor: Robert De Vries, 2 Valeriusstraat, The Hague, Netherlands

[22] Filed: Jan. 21, 1971

[21] Appl. No.: 108,261

[30] Foreign Application Priority Data
Feb. 9, 1970 Netherlands...................... 7001774

[52] U.S. Cl.................. 222/131, 222/229, 222/390, 259/47
[51] Int. Cl............................................ B67d 5/42
[58] Field of Search................... 222/131, 183, 229, 222/242, 386–393, 228, 234, 233, 235, 326, 327, 246, 80; 259/47, 113

[56] References Cited
UNITED STATES PATENTS

| | | | |
|---|---|---|---|
| 676,130 | 6/1901 | Goodfellow | 222/131 |
| 3,475,010 | 10/1969 | Cook et al. | 259/47 |
| 3,195,778 | 7/1965 | Coates | 222/246 X |
| 3,373,906 | 3/1968 | DeHart et al. | 222/235 |
| 3,390,814 | 7/1968 | Creighton et al. | 222/137 |

Primary Examiner—Robert B. Reeves
Assistant Examiner—Francis J. Bartuska
Attorney—Lester Horwitz

[57] ABSTRACT

A container for insulating, transporting and also dispensing ice cream, comprising an insulated cylindrical casing with end closures and a plunger to exert an urging pressure for the dispensing of the ice cream.

1 Claim, 2 Drawing Figures

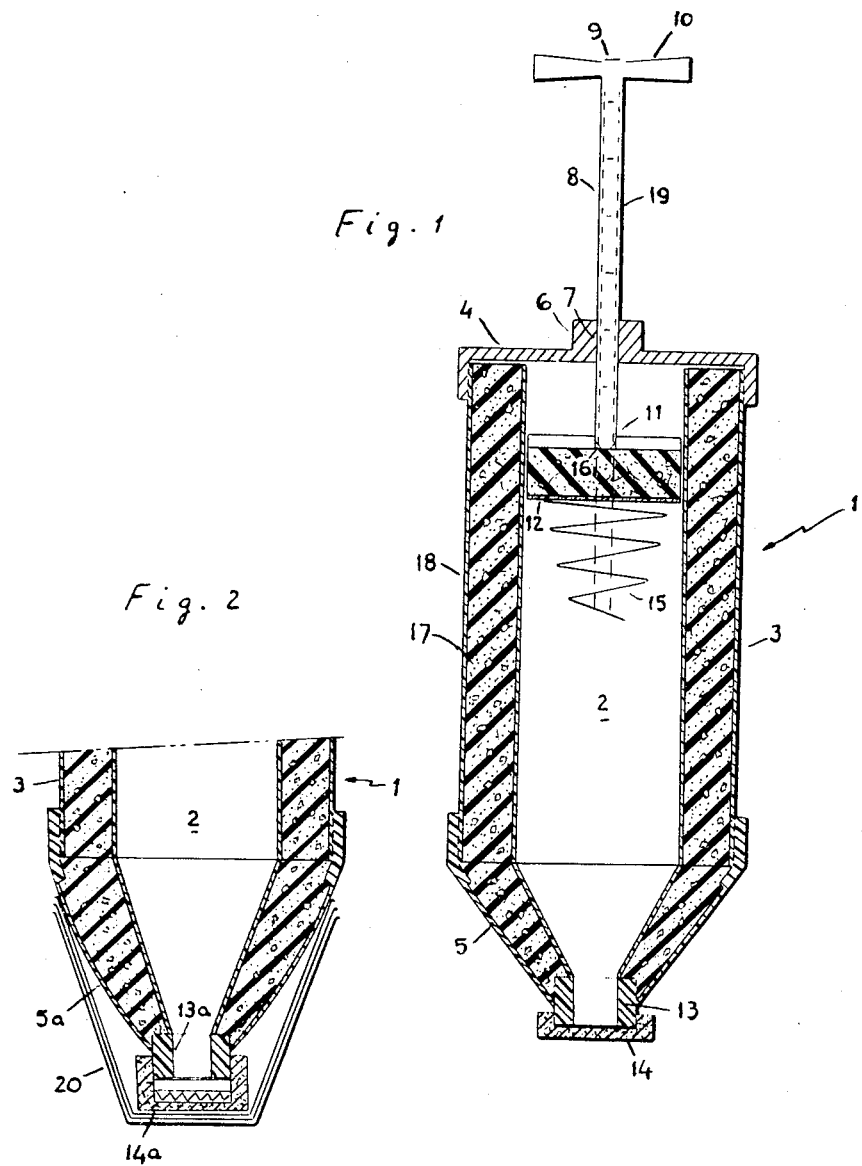

CONTAINER FOR ICE CREAM

BACKGROUND OF THE INVENTION

This invention relates to a container to be used for transporting ice cream and keeping it cold, which container consists of an insulating casing with end closures.

Such a container is known from the British patent specification No. 1 152 037. A disadvantage of this known container for the distribution of ice cream is that the consumer when using it for the transport of ice cream from an ice vendor to home therewith has no means at his disposal, which besides for keeping the ice cream cold during the transport can also directly serve for dispensing the ice cream.

SUMMARY OF THE INVENTION

The present invention has as its object to overcome the aforesaid disadvantage of prior containers for ice cream and is characterised in that in order to also serve as a dispensing container, the container consists of a mainly cylindrical casing, which is provided with a covering of an insulating form-keeping plastic material and a filling of foamed insulating material, and comprises a plunger to exert an urging pressure for the dispensing of the ice cream.

A further difficulty is that the ice cream when heavily cooled can become quite solid and as such is not readily to be squeezed and dispensed by urging it in the way as described for example in the French patent specifications Nos. 720,293 and 1,155,675 for mustard and mayonnaise. To meet this difficulty the invention is further characterised in that the plunger is provided with a plunger rod, and a leader moving ahead of the plunger, and to be moved by the plunger rod, for turning loose the ice cream for the dispensing. Preferably a sharp edged helical or pointed leader is thereby used.

The invention is described more in detail in the following specification with reference to the drawing, in which examples of the invention are shown.

BRIEF DESCRIPTION OF THE DRAWING

FIG. 1 is a central longitudinal section of a thermos container for ice cream according to the invention;

FIG. 2 shows an embodiment, whcih is provided with matching ice cups.

DESCRIPTION OF THE PREFERRED EMBODIMENTS

In FIG. 1 a thermos container 1 is shown, in which ice cream 2 such as soft ice can be taken home and from which dispensing can directly take place. The container 1 consists of a cylindrical casing 3 having at one end a screwed-up cover 4 and at the other end a screwed-up dispensng mouthpiece 5.

The cover 4 includes in the centre a boss 6 having a screw-threaded through-bore 7 therein, through which a screw rod 8 is screwed. The screw rod 8 is at the end 9 outside the contaienr 1 provided with a turning-handle 10 while its end 11 inside the container can be screwed in an urging plunger 12.

When the dispensing mouthpiece 5 is removed from the container the casing 3 can be filled with ice cream from an ice machine (not shown). After that the dispensing mouthpiece 5 which tapers into a nozzle 13, can be screwed again on the casing 3, and the nozzle 13 can be sealed with a stopper 14. The container filled with well preserved ice cream can thereupon be taken along by the consumer. For the dispensing the stopper 14 is removed and by turning the screw rod 8 in the required direction the plunger 12 is displaced and the ice cream is urged out of the container through the nozzle 13. The plunger 12 is provided with a sharp edged helical or pointed leader 15, as shown in FIG. 1, by which the ice cream is turned loose in order to be able to properly squeeze it.

For facilitating the transport of the container the plunger rod 8 is made removable. By screwing back the plunger rod it can namely be turned out of the plunger 12 and be screwed out of the container through the central screw hole 7 in the cover 4. When the dispensing should take place the plunger rod 8 is screwed back again in its place in the plunger 12, whereto the plunger rod end 11 is homingly constructed, as shown at 16.

As shown in the drawing, the casing 3, the dispensing mouthpiece 5 and the plunger 12 consist of a foamed core 17, around which a covering 18 of a rigid, well insulating plastic material is provided. Also the stopper 14 on the dispensing opening 13 can consist of well insulating plastic material, or for this stopper 14 and for the plunger 12 cork can be used.

To fill the container with a proportioned quantity of ice cream and to also permit the dispensing of proportioned quantities therefrom the plunger rod 8 is provided with a measuring scale 19.

In FIG. 2 the dispensing mouthpiece 5a is shown having a nozzle 13a, against which for sealing the container a somewhat resilient stopper 14a is pressed by means of a matching ice cup 20, which is placed over the dispensing mouthpiece and is fixedly pushed thereon, or by means of a stack of ice cups, which are pushed over the dispensing mouthpiece. Accordingly there are always ice cups at hand to receive the dispensed ice cream, whereby these cups before the use as such also first serve a sealing function.

It will be understood that the embodiment of the invention described in the foregoing, which should not be interpreted in a limiting sense, considerably facilitates the taking along and consumption of a purchased quantity of ice cream.

I claim:

1. A container adapted for dispensing ice cream, comprising a cylindrical casing, and a plunger which is movable therein in order to dispense the ice cream from the container, characterized by the container (1) comprising an insulated casing (3) provided with a dispensing nozzle (5) at one end, and a with the dispensing plunger (12) having a screw-threaded plunger rod (8) which is movable in a cover (4) at the opposite end of the casing, said plunger being provided with a, sharp edged helical spiral attached thereto to rotate therewith as a leader (15) said spiral having sharp edges along a portion thereof to be moved to cut and soften the ice cream before dispensing it through the nozzle (5).

* * * * *

UNITED STATES PATENT OFFICE
CERTIFICATE OF CORRECTION

Patent No. 3,752,364　　　　　Dated August 14, 1973

Inventor(s) Robert De Vries

It is certified that error appears in the above-identified patent and that said Letters Patent are hereby corrected as shown below:

In the claim, line 54 delete "with the";

lines 57 and 58 delete ", sharp edged helical".

Signed and sealed this 26th day of February 1974.

(SEAL)
Attest:

EDWARD M. FLETCHER, JR.　　　C. MARSHALL DANN
Attesting Officer　　　　　　Commissioner of Patents